(12) United States Patent
Carney et al.

(10) Patent No.: US 8,681,783 B2
(45) Date of Patent: Mar. 25, 2014

(54) PREVENTION OF CALL SPOOFING IN A VOICE OVER INTERNET PROTOCOL (VOIP) NETWORK

(75) Inventors: Mark D. Carney, Sterling, VA (US); Jeffrey A. Jackson, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 352 days.

(21) Appl. No.: 13/030,603

(22) Filed: Feb. 18, 2011

(65) Prior Publication Data

US 2012/0213082 A1 Aug. 23, 2012

(51) Int. Cl.
*H04B 7/216* (2006.01)
(52) U.S. Cl.
USPC .............................. 370/353; 370/328; 370/351
(58) Field of Classification Search
USPC .......................................... 370/328, 350–353
See application file for complete search history.

(56) References Cited

U.S. PATENT DOCUMENTS

| | | | | |
|---|---|---|---|---|
| 5,970,405 A * | 10/1999 | Kaplan et al. | ................. | 455/410 |
| 6,614,781 B1 * | 9/2003 | Elliott et al. | ................. | 370/352 |
| 7,251,312 B2 * | 7/2007 | D'Evelyn et al. | ............... | 379/45 |
| 7,587,724 B2 * | 9/2009 | Yeap | .............................. | 719/328 |
| 7,613,923 B2 * | 11/2009 | Gilchrist et al. | .............. | 713/168 |
| 8,010,992 B1 * | 8/2011 | Chang et al. | ........................ | 726/1 |
| 8,085,937 B1 * | 12/2011 | Bradley, II | .................... | 380/282 |
| 8,270,588 B2 * | 9/2012 | Schwartz | ................. | 379/210.02 |
| 8,315,386 B2 * | 11/2012 | Park et al. | ..................... | 380/255 |
| 2006/0236088 A1 * | 10/2006 | Walter | ......................... | 713/150 |
| 2008/0120688 A1 * | 5/2008 | Qiu et al. | .......................... | 726/1 |
| 2011/0151839 A1 * | 6/2011 | Bolon et al. | ............... | 455/414.1 |

OTHER PUBLICATIONS

"SWAT teams deployed in 911 telephone fraud: The attacks exploit how 911 systems handle Internet-based phone calls"; Associated Press article retrieved online: http://www.msnbc.msn.com/id/28965633/; print date: Feb. 18, 2011; 4 pages.

* cited by examiner

*Primary Examiner* — Phuc Tran

(57) ABSTRACT

Call spoofing in a Voice over Internet Protocol (IP) system may be detected and/or prevented. A device may receive a call request to initiate a VoIP call. The device may analyze marker information in the call request to determine whether the call request is valid. The device may also analyze the call request, based on call pattern information of a quantity of other calls, to determine whether the call request is suspicious; and complete the call based on the determination of whether the call request is valid and the determination of whether the call request is suspicious.

22 Claims, 9 Drawing Sheets

PREVENTION OF CALL SPOOFING IN A VOICE OVER INTERNET PROTOCOL (VOIP) NETWORK

BACKGROUND

Voice over Internet Protocol (Voice over IP, VoIP) includes a family of methodologies, communication protocols, and transmission technologies for delivery of voice communications and multimedia sessions over IP networks, such as the Internet. The steps involved in originating a VoIP telephone call include signaling and media channel setup, digitization of the analog voice signal, encoding, packetization, and transmission as IP packets over a packet-switched network.

Call spoofing refers to the fraudulent placing of a telephone call in a manner in which the telephone infrastructure (e.g., VoIP systems) are made to believe that the call is being made by a particular party or device when in fact the call is being originated by another party. VoIP may be particularly susceptible to this type of fraud because, under VoIP, signaling and control channels may be in networks in which users have access. As a result, swatting (spoofing calls to 911 and other law enforcement services resulting in SWAT teams being deployed against unsuspecting targets) and other types of fraudulent activities are possible.

As an example of the placement of fraudulent calls, various consumer devices, such as set-top boxes (STBs), may allow users to place calls. A call request may be sent to web servers that communicate with VoIP servers, which may place the call to the requested destination and then ring the caller's designated phone or ring the caller's designated phone and immediately place a call to a destination number. In this situation, a malicious user, such as a malicious user operating through a virus or other malicious programs, may send requests to the same web server used by the consumer device (e.g., the STB) to spoof the call requests from the consumer device.

DETAILED DESCRIPTION

The following detailed description refers to the accompanying drawings. The same reference numbers in different drawings may identify the same or similar elements.

Implementations described herein may include techniques for preventing call spoofing in systems in which call signaling information is transmitted over a channel that may be accessible by user devices. In one implementation, call request messages to a web server may be validated and/or authenticated by the web server using one or more of markers that authenticate the call request messages, server-side techniques based on network call flow, and/or human validation.

Figure 1:
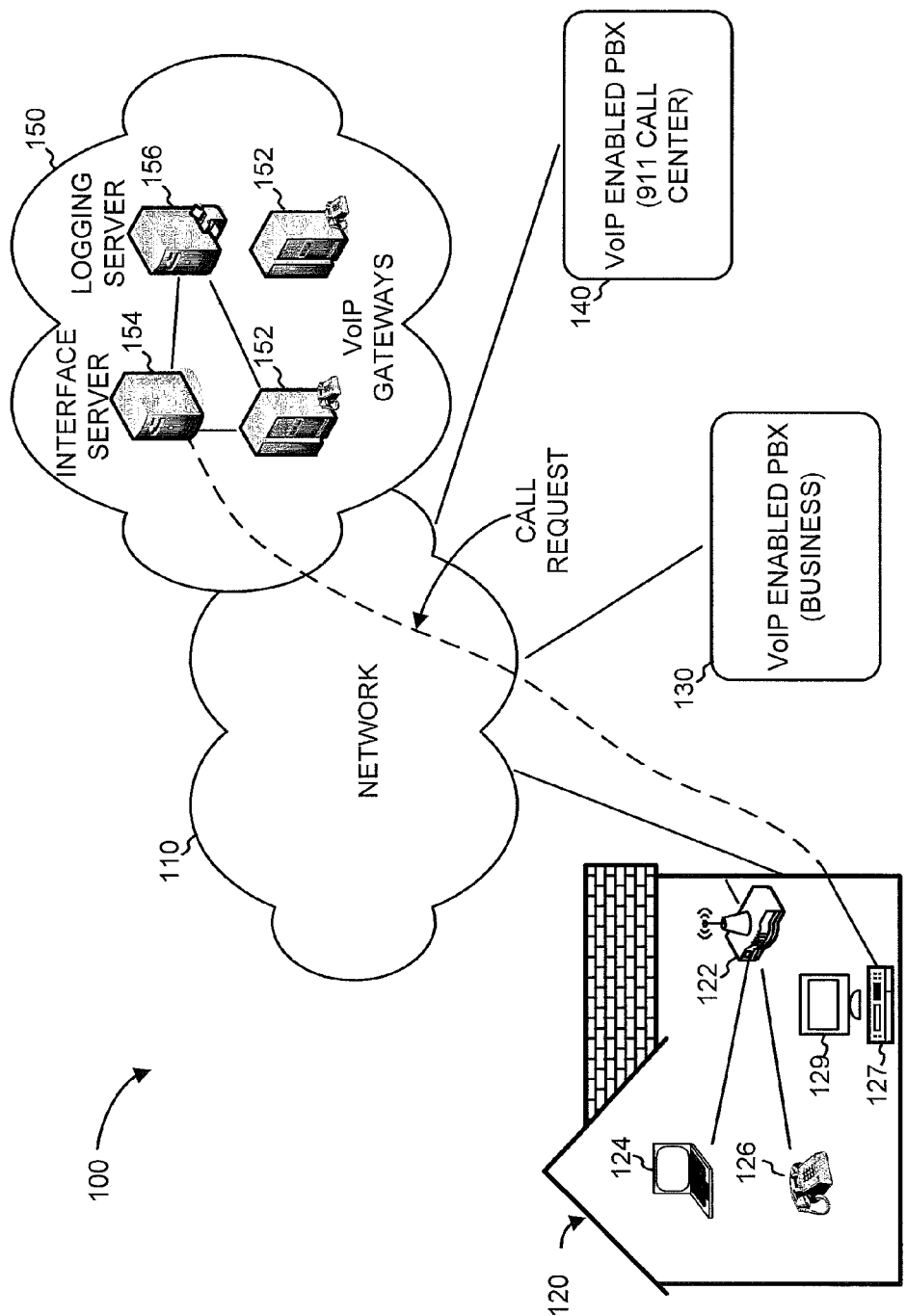
FIG. 1 is a diagram illustrating an example of an environment in which techniques described herein may be implemented.

FIG. 1 is a diagram illustrating an example of an environment 100 in which techniques described herein may be implemented. Environment 100 may include a network 110 that is used to connect a number of entities together to enable VoIP services. The entities may include a customer premise 120 and VoIP enabled private branch exchanges (PBXs) 130 and 140. A second network 150 may include provider infrastructure for enabling the VoIP services.

Network 110 may include a local area network (LAN), a wide area network (WAN), a metropolitan area network (MAN), a wireless network, an optical fiber (or fiber optic)-based network, a cable television network, a satellite television network, or a combination of networks. Network 110 may particularly include an IP network. In one implementation, network 110 may include the Internet.

Customer premise 120 may include a residential entity that is connected to network 110 by a telecommunication company. Customer premise 120 may be connected to network 110 using, for example, a fiber optic connection, a coaxial connection, a satellite connection, or another type of wireless or wired connection. A gateway device may be used to connect customer premise 120 to network 110. For example, for a fiber optic connection, an optical network terminal (ONT) may convert the optical signals into an electrical format that can be used by a wireless router 122. Alternatively, the functionality of the ONT may be incorporated into wireless router 122. Devices in customer premises 120 may include, for example, STBs (e.g., a STB 127), televisions (e.g., a television 129), computers (e.g., a laptop computer 124), a telephone device 126, and home networking equipment (e.g., routers, cables, splitters, local gateways, etc.). Telephone device 126 may include a VoIP telephone that connects directly to the customer premise's network (e.g., wireless router 122) or standard telephones that connect, through an adapter, to the customer premise's network. Devices within customer premise 120 may be connected via wired connections (e.g., coaxial cable, Telecommunications Industry Association category 5 ("cat 5") cable, etc.) and/or wireless connections (e.g., using network devices such as those available under the IEEE 802.11 wireless LAN standards).

In the example shown in FIG. 1, STB 127 is shown as connecting to television 129. STB 127 may be used to control the content shown on television 129. STB 129 may include other applications, such as a "place telephone call" application, through which a user can initiate a telephone call with another party. The place telephone call application may initiate the call on behalf of the user and may result in a call placed to the called party and to the user's designated phone, such as telephone device 126. From the user's perspective, the place telephone call application may be desirable as it may provide a convenient interface for placing a telephone call.

VoIP enabled PBXs 130 and 140 may represent any telephone system supporting multiple telephone numbers. For example, a business may use a PBX to route VoIP calls to a number of telephone stations. VoIP enabled PBXs 130 and 140 are particularly illustrated as business PBX 130 and 911 call center PBX 140. Business PBX 130 may particularly represent a VoIP PBX implemented by a business. Call center PBX 140 may represent a VoIP enabled PBX implemented by an emergency response call center.

Second network 150 may include provider infrastructure for enabling VoIP services. Second network 150 may be implemented by, for example, a telecommunications company or another entity. Although shown as a separate network in FIG. 1, in some implementations, the devices of second network 150 may implemented as devices in network 110.

Second network 150 may include network devices used to enable VoIP communications. Second network 150 may include VoIP gateways 152, an interface server 154, and a logging server 156. VoIP gateways 152 may include devices that operate to convert telephony traffic to IP traffic (and vice versa). VoIP gateways 152 may connect, for example, to one or more traditional telephone networks. By converting between IP and telephony traffic, VoIP gateways 152 may allow calls to be received and placed on the regular telephony network. VoIP gateways 152 may perform additional functions, such as handling signaling and control messages used to control a VoIP session.

Interface server 154 may include one or more computing or network devices through which consumer devices, such as STB 127, may connect. In one implementation, interface server 154 may be a web server and STB 127 may communicate with interface server 154 using, for example, messages sent via the hyper-text transfer protocol (HTTP), extensible markup language (XML), and/or the SOAP protocol. STB 127 may use interface server 154 as the primary interface through which STB 127 obtains data to implement network functions. For example, STB 127 may obtain weather data from interface server 154 to implement a "weather widget." STB 127 may also implement the "place telephone call" application, through which STB 127 may place a telephone call to a called party. For this application, STB 127 may initiate the call by contacting interface server 154, shown in FIG. 1 as "call request," which may contact one of VoIP gateways 152 to initiate the call. Devices other than STB 127, such as other consumer devices, may alternatively or additionally place calls by connecting to interface server 154.

Logging server 156 may include one or more server devices to log transactions with interface server 154 and/or VoIP gateways 152. Logging server 156 may store, for example, call requests placed through interface server 154. Logging server 156 may additionally log other information, such as status or presence information relating to users or other devices in network 110/150.

Although FIG. 1 illustrates exemplary components of example environment 100, in other implementations, environment 100 may include additional, fewer, different, or differently arranged components than those illustrated in FIG. 1 and described herein. Alternatively, or additionally, one or more of the components shown in FIG. 1 may perform functions described as being performed by other of the components shown in FIG. 1.

Figure 2:
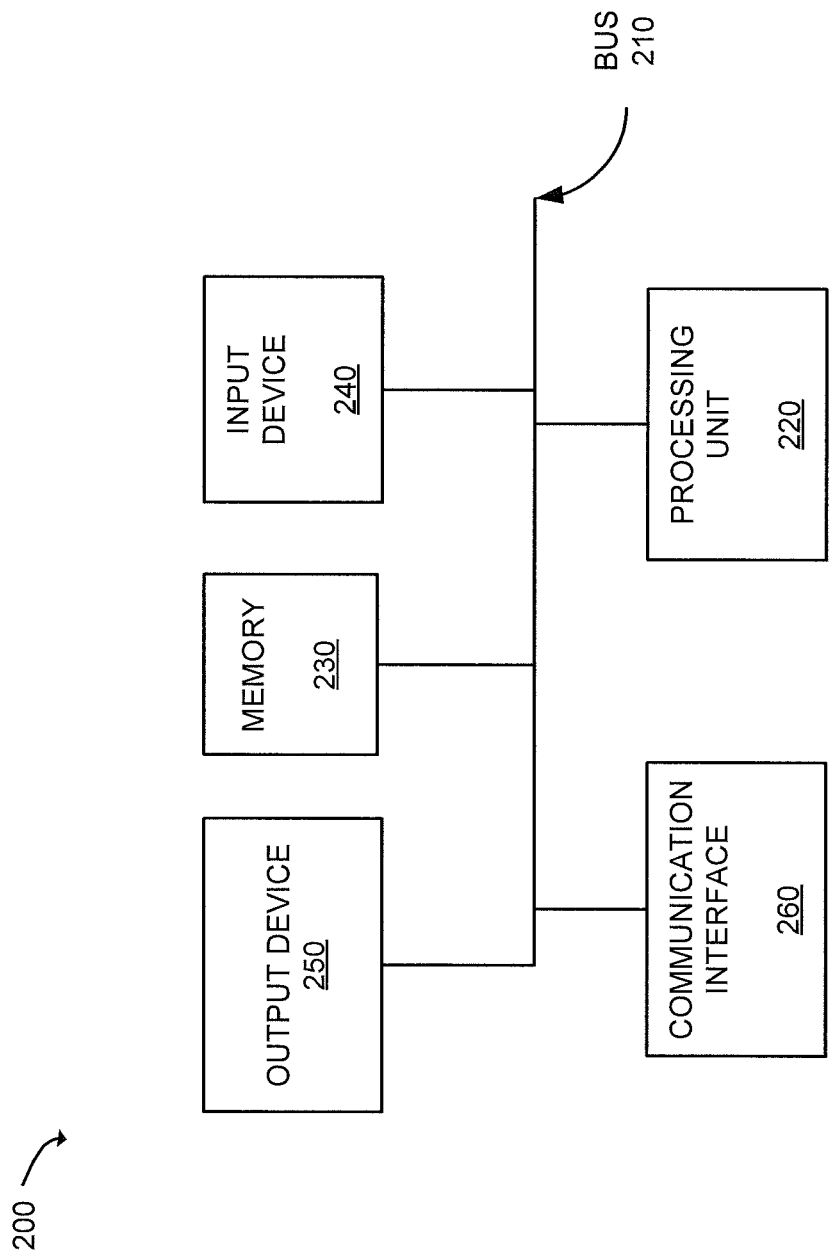
FIG. 2 is a diagram of example components of a device that may correspond to one of the devices of the environment shown in FIG. 1.

FIG. 2 is a diagram of example components of a device 200 that may correspond to one of the devices of environment 100. Device 200 may be included in, for example, STB 127, laptop computer 124, telephone device 126, VoIP gateways 152, interface server 154, and/or logging server 156. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of environment 100 and/or customer premises 120.

As described herein, device 200 may perform certain operations in response to processing unit 220 executing software instructions contained in a computer-readable medium, such as memory 230. A computer-readable medium may be defined as a non-transitory memory device. A memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

As mentioned previously, telephone calls placed on behalf of a user, such as telephone calls placed by an application executing at STB 127, using interface server 154, may be particularly vulnerable to fraudulent call spoofing. For example, malicious software (e.g., a virus) that was inadvertently installed by a user on laptop computer 124 may monitor traffic, between STB 127 and interface server 154 (e.g., over the home network portion of this connection) in order to learn information needed to spoof a call request to interface server 154 such that the spoofed call request appears, to interface server 154, to be a valid request coming from STB 127. At this point, the malicious software may place fraudulent calls.

Although call spoofing was primarily discussed above with respect to call spoofing being performed in customer premise 120, fraudulent call spoofing may also happen in other settings, such as through devices at VoIP enabled PBX 130. The techniques described below to thwart call spoofing can potentially be applied to settings other than customer premise 120 (e.g., a business premise). Further, the techniques described below to thwart call spoofing will be discussed as being performed with respect to a call placement application, executing at STB 127, through which a user can dial a call to a called party. The use of STB 127 is an example of a consumer device. Other consumer or business devices that may place calls on behalf of a user may alternatively be used.

Figure 3:
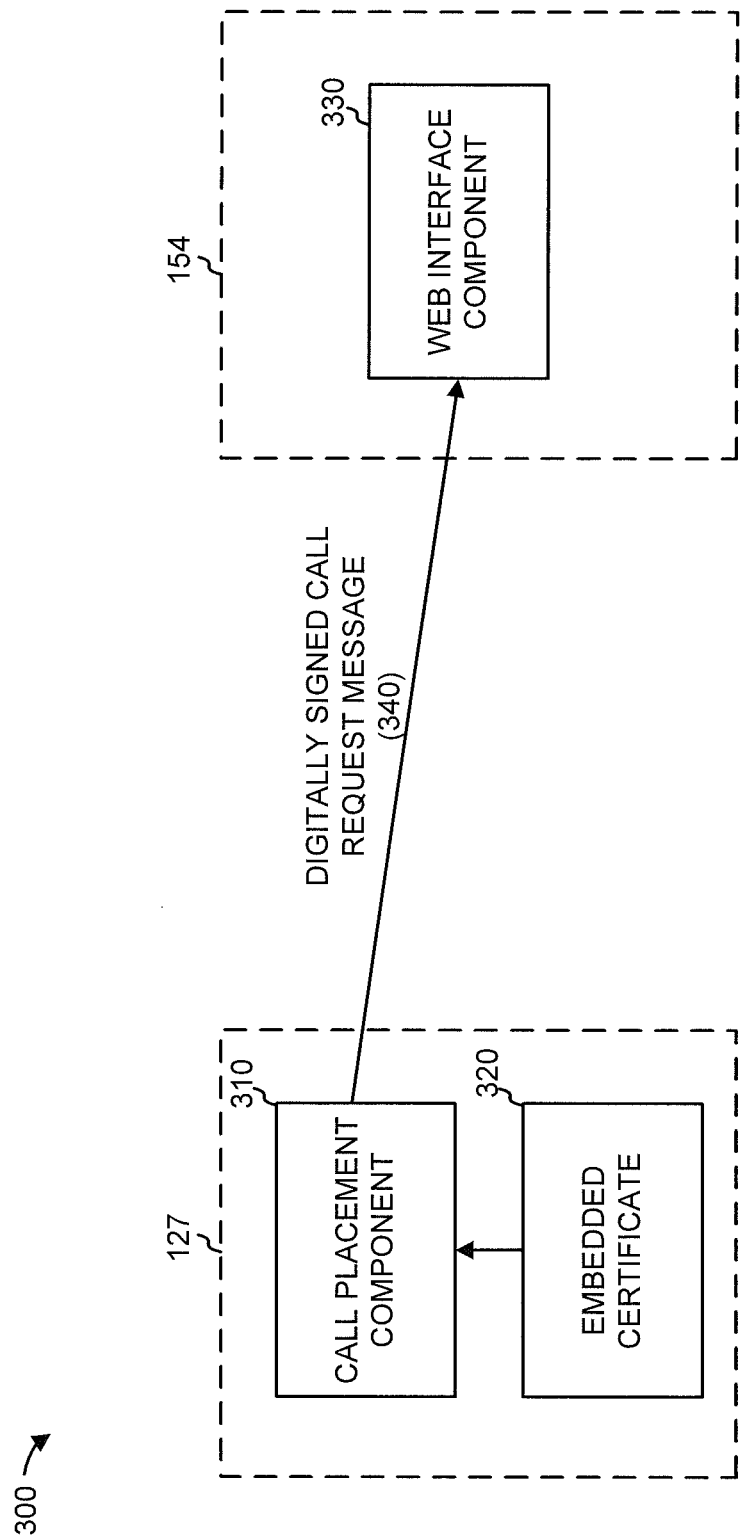
FIGS. 3-8 are diagrams illustrating examples of components that may be used to prevent call spoofing according to a number of embodiments.

FIG. 3 is a diagram illustrating an example of components 300 that may be used to prevent call spoofing in environment 100 according to one embodiment. Components 300 may be implemented by, for example, STB 127 and/or interface server 154, in hardware and/or software. Components 300 may include a call placement component 310, an embedded certificate 320, and a web interface component 330.

Call placement component 310 may include logic at STB 127 to communicate with web interface component 330, such as by exchanging messages using protocols such as HTTP, XML, and/or SOAP. In general, call placement component 310 may respond to user requests to initiate a telephone call, such as by a user selecting a party to call through a graphic interface displayed on television 129 and using a remote control.

Embedded certificate 320 may include a hardware certificate that is associated with STB 127. The certificate may include, for example, a pair of keys in a public key (asymmetric) encryption pair. Embedded certificate 320 may be stored in hardware on STB 127, such as a key loaded into firmware, flash, or another form of non-volatile memory during manufacture or during provisioning. Embedded certificate 320 may be used to digitally sign and/or encrypt messages sent to web interface component 330.

Web interface component 330 may operate to provide the server-side interface through which call placement component 310 communicates. Web interface component 330 may receive and respond to requests from call placement component 310. Web interface component 330 may store (or be connected to fetch) information relating to embedded certificate 320. In implementations in which embedded certificate 320 includes a public key pair, web interface component 330 may store a public key corresponding to the certificate. Using the public key, web interface component 330 may validate and/or authenticate call requests from call placement component 310. When web interface component 330 authenticates and/or validates a call request, web interface component 330 may communicate with VoIP gateways 152 to initiate placing of the call to the called party. VoIP gateways 152 may, for example, initiate a call to the user (e.g., to telephone device 126) and, after the user picks up the call, initiate a call to the called party.

In operation, when a user of STB 127 places a call using the telephone calling application of STB 127, call placement component 310 may send a call request message (a digitally signed call request message 340) to web interface component 330 of interface server 154. All or part of the call request message may be digitally signed or otherwise authenticated using embedded certificate 320. For example, the calling number (e.g., the number of the user of STB 127) and the called number may be hashed and digitally encrypted to generate the digital signature. Web interface component 330 may validate/authenticate the digital signature based on a public key corresponding to embedded certificate 320. In some implementations, subsequent communications between call placement component 310 and web interface component 330 may also be digitally signed. Because embedded certificate 320 is embedded as part of the hardware of STB 127, malicious code executing on a device other than STB 127 may not be able to access embedded certificate 320 and will thus not be able to spoof a call request message.

Although FIG. 3 shows example components 300, in other implementations, fewer components, different components, differently arranged components, or additional components may be included. Alternatively, or additionally, one or more components 300 may perform one or more other tasks described as being performed by one or more other components 300.

Figure 4:
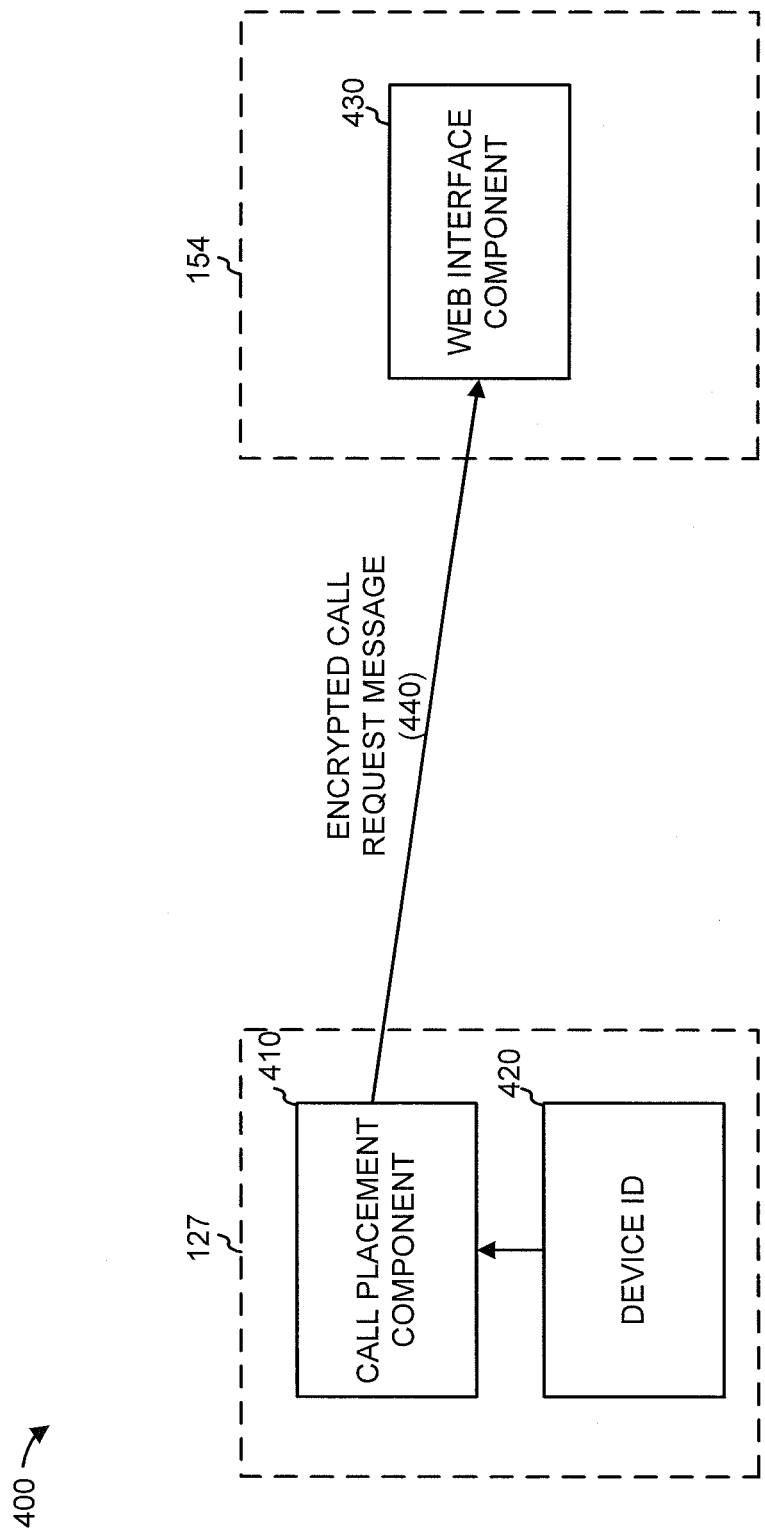

FIG. 4 is a diagram illustrating an example of components 400 that may be used to prevent call spoofing in environment 100 according to another embodiment. Components 400 may be implemented by, for example, STB 127 and/or interface server 154, in hardware and/or software. Components 400 may include a call placement component 410, a device identifier (ID) 420, and a web interface component 430.

Call placement component 410 may include logic at STB 127 to communicate with web interface component 430, such as by exchanging messages using protocols such as HTTP, XML, and/or SOAP. In general, call placement component 410 may respond to user requests to initiate a telephone call, such as by a user selecting a party to call through a graphic interface displayed on television 129 and using a remote control.

Device ID 420 may include a hardware identification value, software identification value, or other "secret" value that is associated with STB 127. Device ID 420 may be used to synchronously encrypt call request messages (encrypted call request message 440) sent to web interface component 430. For example, the calling telephone number and the called telephone number may be encrypted, using synchronous encryption techniques in which device ID 420 is used as the encryption/decryption key.

Web interface component 430 may operate to provide the server-side interface through which call placement component 410 communicates. Web interface component 430 may receive and respond to requests from call placement component 410. Web interface component 430 may store (or be connected to fetch) device ID 420 corresponding to each STB 127. Web interface component 430 may use device ID 420 to decrypt the encrypted call request message. When web interface component 430 is able to correctly decrypt a call request message, web interface component 430 may communicate with VoIP gateways 152 to initiate placing of the call to the called party. VoIP gateways 152 may, for example, initiate a call to the user (e.g., to telephone 126) and initiate a call to the called party.

The operation of call placement component 410 may be generally similar to the operation of call placement component 310. However, instead of using a public/private key pair to digitally sign the call request message using asynchronous encryption, a symmetric encryption technique may be used with a single encryption/decryption key. A symmetric key may be used with devices, such as legacy STB devices, that do not include embedded certificate 320 but that do include a value that can be used as a symmetric key.

Although FIG. 4 shows example components 400, in other implementations, fewer components, different components, differently arranged components, or additional components may be included. Alternatively, or additionally, one or more components 400 may perform one or more other tasks described as being performed by one or more other components 400.

Figure 5:
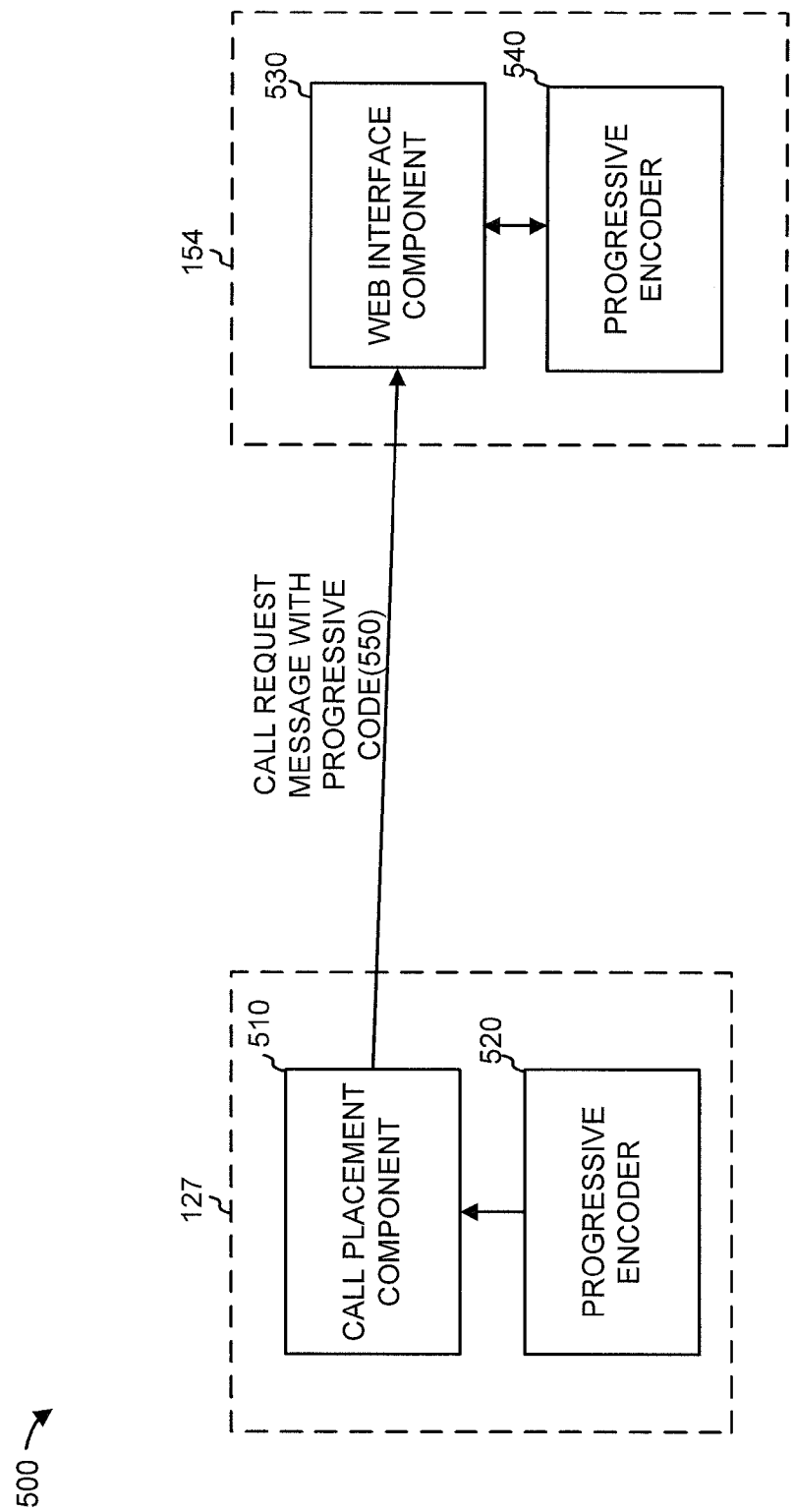

FIG. 5 is a diagram illustrating an example of components 500 that may be used to prevent call spoofing in environment 100 according to another embodiment. Components 500 may be implemented by, for example, STB 127 and/or interface server 154, in hardware and/or software. Components 500 may include a call placement component 510, a progressive encoder 520, a web interface component 530, and a progressive encoder 540.

Call placement component 510 may include logic at STB 127 to communicate with web interface component 530, such as by exchanging messages using protocols such as HTTP, XML, and/or SOAP. In general, call placement component 510 may respond to user requests to initiate a telephone call, such as by a user selecting a party to call through a graphic interface displayed on television 129 and using a remote control.

Progressive encoder 520 may generate progressive codes that may be included in a call request message (a call request message with progressive code 550). Progressive encoder 520 may generate a sequence of output codes. The next code in the sequence may be dependent on the previous output. Progressive encoder 520 may include, for example, an S-Box (substitution box) in which a table may be used to transform an input value (e.g., an m bit input value) into an output value (e.g., an n bit output value). The output code may be included in the call request message and used to validate the call request message.

Web interface component 530 may operate to provide the server-side interface through which call placement component 510 communicates. Web interface component 530 may receive and respond to requests from call placement component 510, such as call request message 550, including the progressive code. Web interface component 530 may use the progressive code that is included in the call request messages, from call placement component 510, to validate a received call request message 550 by comparing the received progressive code with the expected progressive code. The expected progressive code may be obtained from progressive encoder 540.

Progressive encoder 540 may generate progressive codes that may be used by web interface component 530 to validate the received call request messages. Progressive encoder 540 may be implemented identically to progressive encoder 520. Progressive encoder 540 may be implemented on a per-device (e.g., per STB 127) basis, in which each STB 127 is associated with a different progressive encoder 540. In one implementation, the per-device progressive encoder may be implemented by storing the state of progressive encoder 540 for each STB 127. In this manner, the next progressive code in the sequence, for each STB 127, may be obtained when a call request message is received.

In some implementations, progressive encoders 520/540, instead of including a single S-Box, may use multiple S-Boxes, where the output of one S-Box is used to select a next S-Box to use. This may improve the security of progressive encoder 520/540.

Using progressive encoders to generate validation codes, as described with respect to FIG. 5, may provide a fast and inexpensive way to validate call request messages without necessarily requiring a pre-shared secret key or a pre-stored public/private key pair.

Although FIG. 5 shows example components 500, in other implementations, fewer components, different components, differently arranged components, or additional components may be included. Alternatively, or additionally, one or more components 500 may perform one or more other tasks described as being performed by one or more other components 500.

Figure 6:
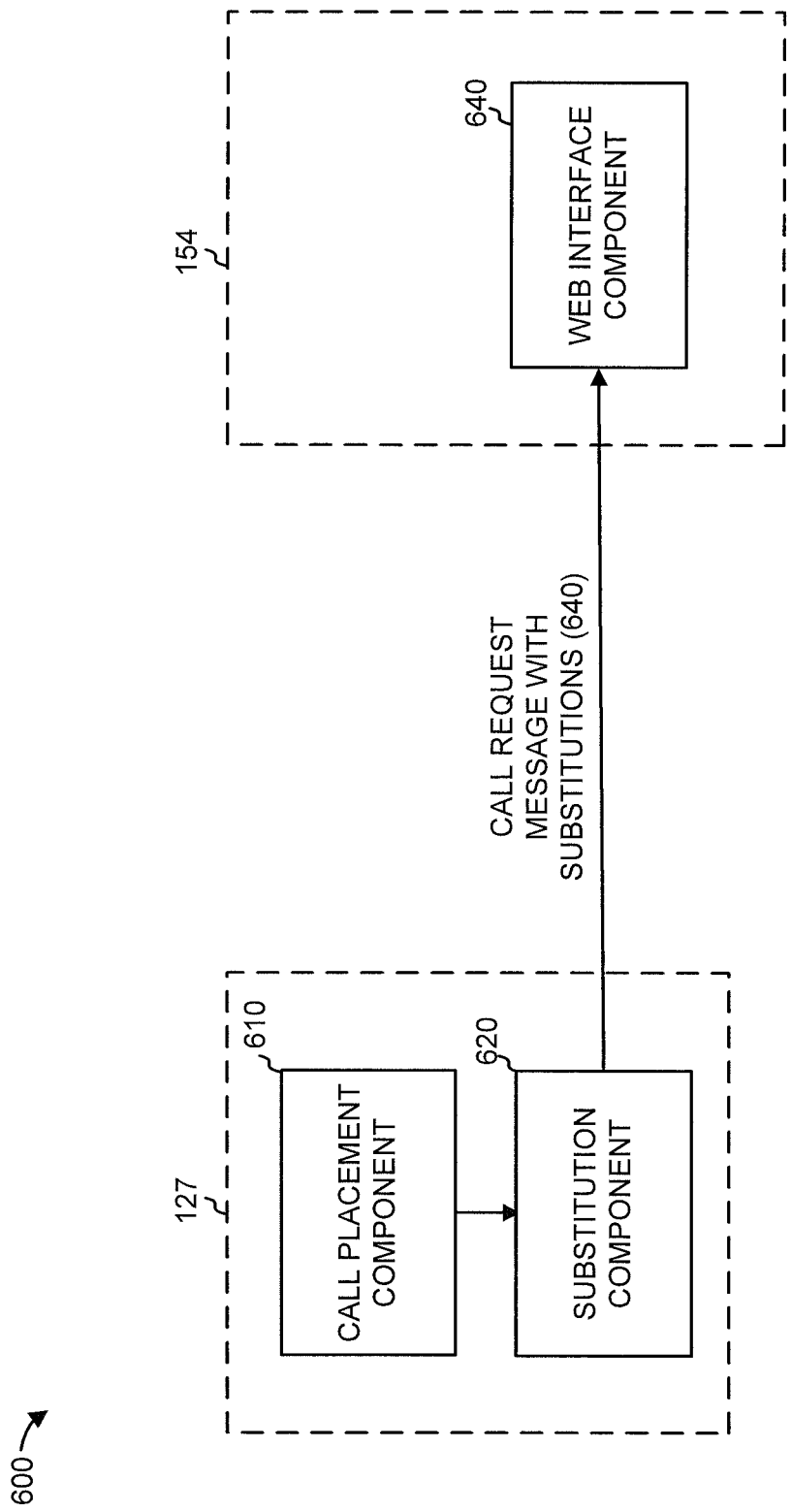

FIG. 6 is a diagram illustrating an example of components 600 that may be used to prevent call spoofing in environment 100 according to another embodiment. Components 600 may be implemented by, for example, STB 127 and/or interface server 154, in hardware and/or software. Components 600 may include a call placement component 610, a substitution component 620, and a web interface component 630.

Call placement component 610 may include logic at STB 127 to communicate with web interface component 630, such as by exchanging messages using protocols such as HTTP, XML, and/or SOAP. In general, call placement component 610 may respond to user requests to initiate a telephone call, such as by a user selecting a party to call through a graphic interface displayed on television 129 and using a remote control.

Substitution component 620 may perform substitution of certain values or sections of messages sent from call placement component 610 to web interface component 640. The substitutions may be, for example, insertions of predefined character strings before or after certain called numbers or replacement of certain strings with other strings. The added strings may be constant values, serial numbers, etc. For example, for a call request message in which the dialed number is "911," substitution component 620 may modify "911" to "VA9L111D," "SECRET911," "EmergNineOneOneSrvs," or some other character sequence. In one implementation, the character sequence to insert may be a sequence that is predetermined between substitution component 620 and web interface component 640. Alternatively, the character sequence may be generated based on information associated with STB 127, the user's account, or with other information (such as the IP address assigned to the user).

Web interface component 640 may operate to provide the server-side interface through which call placement component 610 communicates. Web interface component 640 may receive call request messages (a call request message with substitutions 640) and validate the call request messages by extracting the substitutions and comparing the substitutions in the message with the expected substitutions. Web interface component 640 may look up the expected substitutions based on, for example, an identification of STB 127, which may be included in call request message, the IP address of the received call request message 640, or based on other information. Alternatively or additionally, the substitutions may be predetermined based on, for example, the call type (e.g., toll call, 911 call, etc.).

Using substitutions, as described with respect to FIG. 6, may provide a relatively simple and cost-effective technique to provide a layer of security to call requests. It may be desirable, when using substitutions, as implemented by substitution component 620, to include additional layers of encryption or protection, such as requiring that STB 127 and interface server 154 communicate over a secure socket layer (SSL) connection.

Although FIG. 6 shows example components 600, in other implementations, fewer components, different components, differently arranged components, or additional components may be included. Alternatively, or additionally, one or more components 600 may perform one or more other tasks described as being performed by one or more other components 600.

Call request validation, as described above with respect to FIGS. 3-6, may generally include "marking" the call request messages (or other messages sent by STB 127) through the use of encryption, substitution, or other types of codings, in order to make the call signaling messages more difficult for malicious code to spoof. In addition or alternatively to using marker information in the call request messages, server-side techniques may be used to make the call signaling messages more difficult to spoof. Server-side techniques are described in more detail below.

Figure 7:
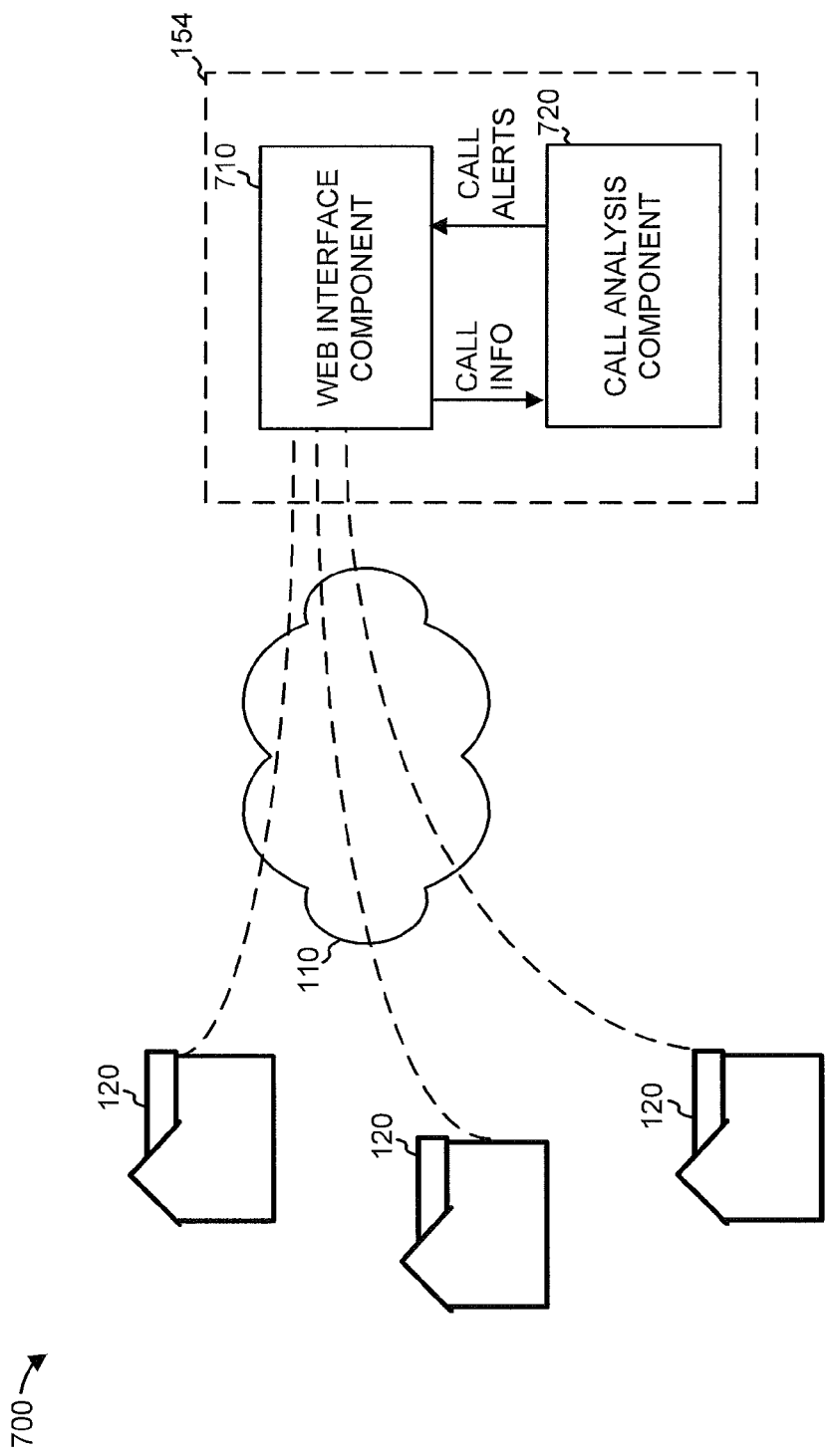

FIG. 7 is a diagram illustrating an example of components 700 that may be used to prevent call spoofing in environment 100 according to another embodiment. In FIG. 7, web interface server 154 is illustrated as providing connection services to a number of customer premises 120 over network 110. Web interface server 154 may include a web interface component 710 and a call analysis component 720.

Web interface component 710 may generally operate to provide the server-side interface through which STBs 127 at customer premises 120 obtain web services, such as initiation of telephone calls. Web interface component 710 may perform validation of call requests messages as described previously with respect to FIGS. 3-6. Alternatively or additionally, web interface component 710 may determine whether to connect a call based on other factors, such as call pattern information. Web interface component 710 may forward information relating to calls (CALL INFO), such as telephone numbers being called, from one or more of customer premises 120, to call analysis component 720.

Call analysis component 720 may analyze call pattern information, such as historical call information from a number of users, to determine if suspicious calling activity is taking place. A malicious virus, which infects a number of customer premises 120, may be programmed, for example, to dial a particular 900 toll number. Thus, a sudden spike in calls to that toll number, from a number of users, may indicate suspicious activity. Call analysis component 720 may monitor the call information from web interface component 710 to determine whether one or more telephone numbers should be considered suspicious numbers. For example, if more than a threshold number (e.g., a predetermined threshold value set by an operator or one determined based on a dynamic analysis of a typical number of calls to the telephone number during a normal period) of calls are placed to a certain telephone number during a certain period, that telephone number may considered to be suspicious. In this case, call analysis component 720 may inform web interface component 710 of the suspect telephone number (CALL ALERTS). For example, call analysis component 720 may direct web interface component 710 to block calls to that telephone number, require calls to that telephone number to be confirmed by the user, or take some other action for calls to that telephone number. For some numbers, such as numbers that are particularly susceptible to call spoofing fraud (e.g., toll numbers), lower threshold values may be used by call analysis component 720.

In one implementation, for certain numbers, such as 911 emergency numbers, it may be undesirable and/or illegal to block calls even if the calls are determined to likely be fraudulent. With these numbers, the call alert information provided by call analysis component 720 may include additional information that may be provided by web interface component 710 to VoIP gateways 152. For example, information such as calling line identification (CLID), calling number identification (CNID), user account information, or other information may be provided, such as embedded within called ID data. The additional information may be used by the emergency response agency when handling the call.

Although FIG. 7 shows example components 700, in other implementations, fewer components, different components, differently arranged components, or additional components may be included. Alternatively, or additionally, one or more components 700 may perform one or more other tasks described as being performed by one or more other components 700. In some implementations, the functions discussed for web interface component 710 and/or call analysis component 720 may be implemented at VoIP servers, such as VoIP gateways 152.

Figure 8:
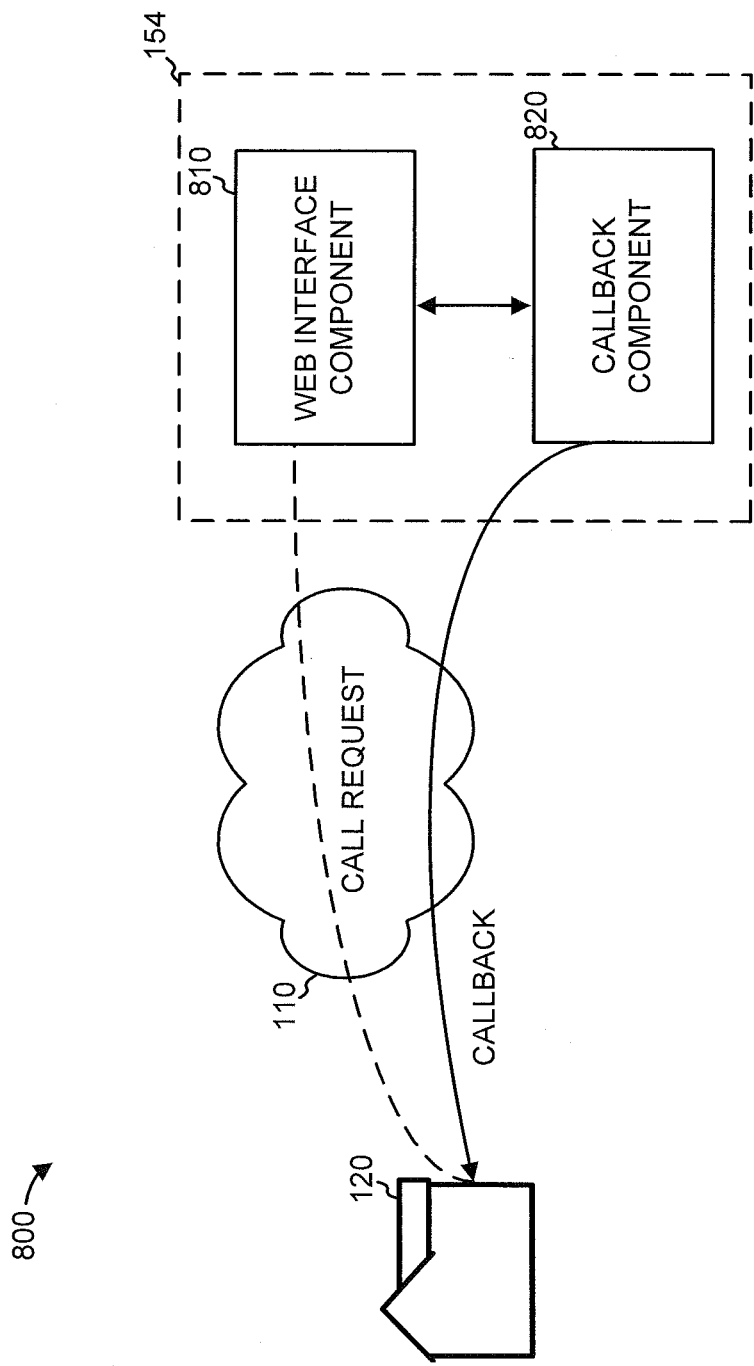

FIG. 8 is a diagram illustrating an example of components 800 that may be used to prevent call spoofing in environment 100 according to another embodiment. In FIG. 8, web interface server 154 is illustrated as providing connection services to customer premise 120 over network 110. Web interface server 154 may include a web interface component 810 and a callback component 820.

Web interface component 810 may generally operate to provide the server-side interface through which STBs 127 at customer premise 120 obtain web services, such as initiating telephone calls. Web interface component 810 may perform validation of call requests messages as described previously with respect to FIGS. 3-6. Web interface component 810 may also receive call alerts relating to suspicious calls, such as call alerts from call analysis component 720 (FIG. 7). Based on the result of the call alerts and/or based on one or more results of the call validations, web interface component 810 may determine whether to perform a callback to the customer premise associated with the STB that originated the call. The callback may be used to additionally validate the call in situations in which the call request is determined to be suspicious.

Callback component 820 may perform callbacks to customer premise 120, such as callbacks performed based on a request from web interface component 810, to validate a call request. In one implementation, callback component 820 may perform an automated callback in which an automated voice prompt may ask the user to verify the original call request. For example, the automated voice prompt may ask the user to press various digits on the phone to verify the call. The callback may be made to a telephone number associated with STB 127. The prompts may include, for example: (1) a prompt to confirm that the user intended to place the call, (2) a prompt to report the call as fraudulent or unintentional, (3) a prompt to temporarily disable calls from STB 127, (4) a prompt to disable toll calls, (5) a prompt to temporarily flag emergency calls as invalid to prevent penalties from local 911 services, and/or (6) a prompt to connect the user to a live operator.

By including a callback for certain calls, such as calls that are suspected of being fraudulent, an additional level of security can be imposed on calls originating from vulnerable devices, such as STB 127 in potentially open networks.

Although FIG. 8 shows example components 800, in other implementations, fewer components, different components, differently arranged components, or additional components may be included. Alternatively, or additionally, one or more components 800 may perform one or more other tasks described as being performed by one or more other components 800.

Figure 9:
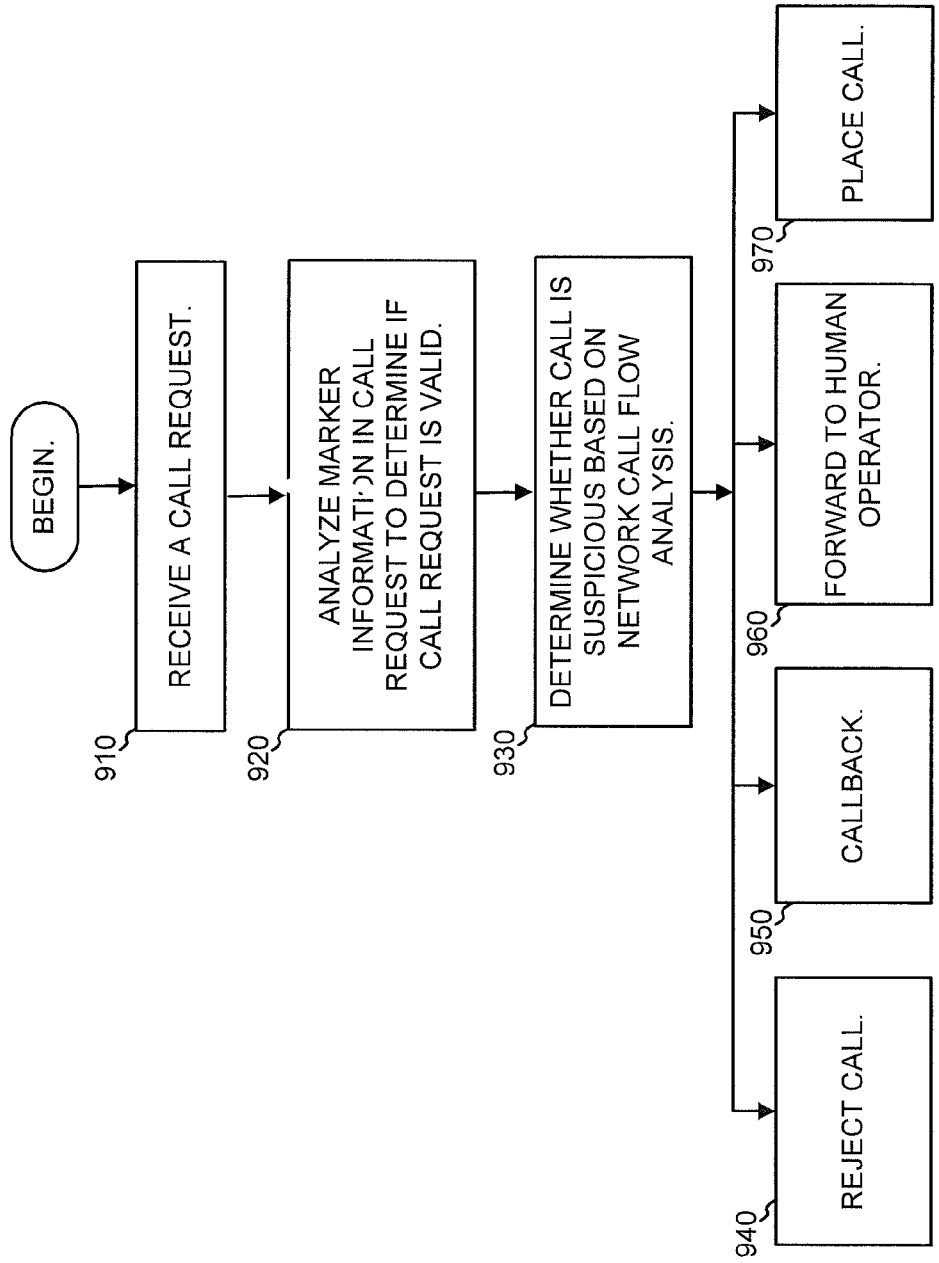
FIG. 9 is a flow chart illustrating an example of a process for preventing call spoofing.

FIG. 9 is a flow chart illustrating an example of a process 900 for preventing call spoofing. Process 900 may be performed by interface server 154.

Process 900 may include receiving a call request (block 910). The call request may be a call request transmitted by a telephone calling application executing at STB 127. The call request may include the telephone number of the called party. The call request may also include the telephone number of the calling party. Additionally, the call request may include one or more markers used for validation and/or authentication of the call request. The marker information may include, for example, a digital signature (as discussed with respect to FIG. 3), encrypted data (as discussed with respect to FIG. 4), progressive code markers (as discussed with respect to FIG. 5), and/or substitutions (as discussed with respect to FIG. 6). In some implementations, the call request message may include a number of types of marker information. For example, substitution may be applied to a call request message and then the substituted call request message may be encrypted.

Process 900 may further include analyzing the marker information in the call request to determine if the call request is valid (i.e., not fraudulent) (block 920). The analysis may be performed as described previously, with respect to FIGS. 3-6, depending on the type of included marker information.

Process 900 may further include determining whether a call is suspicious based on network call flow analysis (block 930). For example, call pattern information may be analyzed, as performed by call analysis component 720, to determine if suspicious calling activity is taking place. The result of the analysis may include an indication of the likelihood that the call is a spoofed call. In some implementations or in some situations, call flow analysis may not be performed. For example, call flow analysis may only be performed when the called number is in a class of numbers that are particularly likely to be the target of spoofing attacks, such toll calls and 911 calls.

Based on the analyzed marker information and the call flow analysis, a number of actions may be taken. An example set of possible actions are shown in FIG. 9 in blocks 940-970.

A call that is determined to be fraudulent or highly likely to be fraudulent may be rejected (block 940). For example, if a digital signature is being used to validate/authenticate call requests and the digital signature is not valid for STB 127, the call request may be determined to be fraudulent or erroneous and may be rejected outright. In some implementations, an indication that there was an error processing the call request may be sent back to STB 127.

A call that is determined to be potentially fraudulent may be subject to further verification based on a callback operation (block 950). The callback may be performed as described above with respect to the description of callback component 820. As one example of a situation in which a callback operation may be performed, consider the situation in which substitution-based marker information is used in conjunction with network call flow analysis. Substitution-based marker information may generally be considered a relatively weak form of authentication. Accordingly, if either the substitution-based marker information fails or the call flow analysis indicates a suspicious call, a callback may be performed.

Some calls may be forwarded to a human operator for further review (block 960). For example, a 911 call that is determined to be potentially suspicious may be forwarded to a human operator, who may review information relating to the call and make a final determination on whether to complete the call.

Calls that are determined to not be suspicious may be placed (block 970). For example, a call that passes marker-based and network call flow-based analysis may be completed as normal. The call may thus be forwarded to a VoIP gateway 152 or to another VoIP network device, which may call the calling party, and when the calling party answers the phone, call the destination party. In some situations, all calls may be logged by logging server 156. Alternatively, only calls that are determined to be somewhat suspicious (e.g., as determined by network call flow analysis), but still authentic enough to complete, may be logged by logging server 156.

Techniques for preventing call spoofing were described above. The described techniques may be used to prevent fraudulent call spoofing for toll calls, 911 calls, or other calls. Information gathered during the processes described herein may also be used to provide certain entities, such as emergency first providers, with additional information that can be used in handling received calls (e.g., suspicious calls may be given lower priority in the emergency call queue).

Additionally, in some implementations, the called party may also be provided with information relating to the call (such as whether a call is determined to be suspicious). This may give the called party a chance to reject the call based on the determination of whether the call may be fraudulent.

While a series of blocks has been described with regard to FIG. 9, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device-implemented method, comprising:
receiving, by the network device, a call request to initiate a voice over Internet Protocol (VoIP) call, the call request being issued by a computing device on behalf of a calling party that is placing a call between a telephone device of the calling party, that is different than the computing device, and a telephone device of the called party;
analyzing, by the network device, marker information in the call request to determine whether the call request, issued by the computing device on behalf of the calling party, was validly issued by the computing device;
analyzing, by the network device, the call request, based on call pattern information of a quantity of other calls, to determine whether the call request is suspicious; and
initiating, by the network device, completion of the call based on the determination of whether the call request was validly issued and the determination of whether the call request is suspicious.

2. The method of claim 1, where analyzing the marker information further includes:
determining whether a digital signature in the call request is valid.

3. The method of claim 2, where the digital signature is based on a private key embedded in hardware of the computing device that issued the call request.

4. The method of claim 1, where analyzing the marker information further includes:
decrypting the call request using a symmetric encryption technique and a key associated with the computing device that issued the call request.

5. The method of claim 1, where analyzing the marker information further includes:
determining whether a progressive code in the call request is valid.

6. The method of claim 1, where analyzing the marker information further includes:
extracting substitution characters from the call request message; and
determining whether the substitution characters are valid.

7. The method of claim 1, where the call pattern information is determined from historical call data made by users.

8. The method of claim 1, where analyzing the call request further includes:
determining whether the called number of the call request is a suspicious number based on a comparison of a number of recent calls made to the number, by a plurality of users, to a threshold value.

9. The method of claim 1, further comprising:
calling back a telephone number of a user associated with a computing device that issued the call request; and
prompting the user to verify that the call request is valid.

10. The method of claim 1, further comprising:
forwarding the call request to a human operator for validation of the call request.

11. The method of claim 1, further comprising:
logging the call request when the call request is determined to be suspicious.

12. A non-transitory computer-readable medium containing programming instructions for execution by one or more processors, the programming instructions including:
instructions to receive a call request to initiate a voice over Internet Protocol (VoIP) call, the call request being issued by a computing device on behalf of a calling party that is placing a call between a telephone device of the calling party, that is different than the computing device, and a telephone device of the called party;
instructions to analyze marker information in the call request, issued by the computing device on behalf of the calling party, to determine whether the call request was validly issued by the computing device;
instructions to analyze the call request based on call pattern information of a quantity of other calls, to determine whether the call request is suspicious; and
instructions to initiate completion of the call based on the determination of whether the call request was validly issued and the determination of whether the call request is suspicious.

13. The non-transitory computer-readable medium of claim 12, where the instructions to analyze the marker information further include:
instructions to determine whether a digital signature in the call request is valid;
instructions to decrypt the call request using a symmetric encryption technique and a key associated with a computing device that issued the call request;
instructions to determine whether a progressive code in the call request is valid; or
instructions to extract substitution characters from the call request and determine whether the substitution characters are valid.

14. The non-transitory computer-readable medium of claim 12, where the call pattern information is determined from historical call data made by users.

15. The non-transitory computer-readable medium of claim 12, where the instructions to analyze the call request based on call pattern information further include:
instructions to determine whether the called number of the call request is a suspicious number based on a comparison of a number of recent calls made to the called number, by a plurality of users, to a threshold value.

16. A network server comprising:
one or more processors; and
one or more memories, coupled to the one or more processors, the one or more memories storing instructions, that when executed by the one or more processors, cause the one or more processors to:
receive a call request, from a computing device, to initiate a voice over Internet Protocol (VoIP) call between a calling telephone number and a called telephone number, the call request being issued by the computing device on behalf of a calling party that is placing a call between a telephone device of the calling party, that is different than the computing device, and a telephone device of the called party;
analyze information contained in the call request to determine whether the call request, issued by the computing device on behalf of the calling party, was validly issued by the computing device;
analyze call pattern information of a quantity of other calls issued by the computing device and other computing devices, to determine whether the call request is suspicious; and
initiate completion of the call between the calling telephone number and the called telephone number based on the determination of whether the call request was validly issued and the determination of whether the call request is suspicious.

17. The network server of claim 16, where the network server presents a web interface to the computing device.

18. The network server of claim 16, where the computing device includes a set-top box.

19. The network server of claim 16, where, when analyzing the information contained in the call request, the one or more processors additionally:
determine whether a digital signature in the call request is valid;
decrypt the call request using a symmetric encryption technique and a key associated with a computing device that issued the call request;
determine whether a progressive code in the call request is valid; or
extract substitution characters from the call request and determine whether the substitution characters are valid.

20. The network server of claim 16, where the call pattern information is determined from historical call data made by users.

21. The network server of claim 16, where, when analyzing the call pattern information, the one or more processors additionally:
determine whether the called telephone number is a suspicious number based on a comparison of a number of recent calls made to the called telephone number, by a plurality of users, to a threshold value.

22. The network server of claim 16, where the one or more processors additionally:
call back a telephone number of a user associated with the computing device; and
prompt the user to verify that the call request is valid.

* * * * *